United States Patent [19]

Shivers, Jr. et al.

[11] 4,074,447
[45] Feb. 21, 1978

[54] STUMP CUTTING AND PRECISION DIGGING APPARATUS

[76] Inventors: Norman E. Shivers, Jr.; David E. Shivers, both of 121 W. El Segundo, Los Angeles, Calif. 90061; Paul N. Shivers, 424 E. Foothill Blvd., Apt. D, Monrovia, Calif. 91610

[21] Appl. No.: 714,568

[22] Filed: Aug. 16, 1976

[51] Int. Cl.² .............................................. A01G 23/06
[52] U.S. Cl. .................................... 37/2 R; 37/94; 144/2 N; 172/512; 241/37.5; 299/39
[58] Field of Search ............ 37/94, 189, 2 R, DIG. 6; 144/2 N, 2 Z, 241, 311, 252 R; 299/39, 89; 172/112, 42, 27, 28, 512; 56/504, 500, 12.7; 83/928; 241/37.5, 101.7

[56] References Cited

U.S. PATENT DOCUMENTS

| 3,157,437 | 11/1964 | Gonski | 299/89 X |
|---|---|---|---|
| 3,307,880 | 3/1967 | Newton et al. | 299/89 X |
| 3,308,860 | 3/1967 | De Shano | 144/2 N |
| 3,336,958 | 8/1967 | Carlton | 144/2 N |
| 3,342,530 | 9/1967 | Krekeler | 299/89 |
| 3,577,664 | 5/1971 | Sing et al. | 37/DIG. 6 |
| 3,625,267 | 12/1971 | Welborn | 144/2 N |
| 3,732,905 | 5/1973 | Pickel | 144/2 N |
| 3,783,914 | 1/1974 | Daugherty et al. | 144/2 N |
| 3,935,887 | 2/1976 | Van Zante et al. | 144/2 N X |

FOREIGN PATENT DOCUMENTS

| 1,335,772 | 7/1963 | France | 280/47.37 |
|---|---|---|---|
| 556,966 | 2/1957 | Italy | 280/47.37 |

*Primary Examiner*—Clifford D. Crowder
*Attorney, Agent, or Firm*—Frank Frisenda, Jr.

[57] ABSTRACT

A stump cutter and earth ripper device having a balanced channel frame chassis, the device including a forward centrally disposed cutting wheel having a plurality of radially extending cutting teeth circumferentially mounted thereon. The frame is supported by a pair of pneumatic tires mounted on individually adjustable and telescopic axles. A unique and rotationally adjustable handle provides accurate control of the device during operation.

18 Claims, 8 Drawing Figures

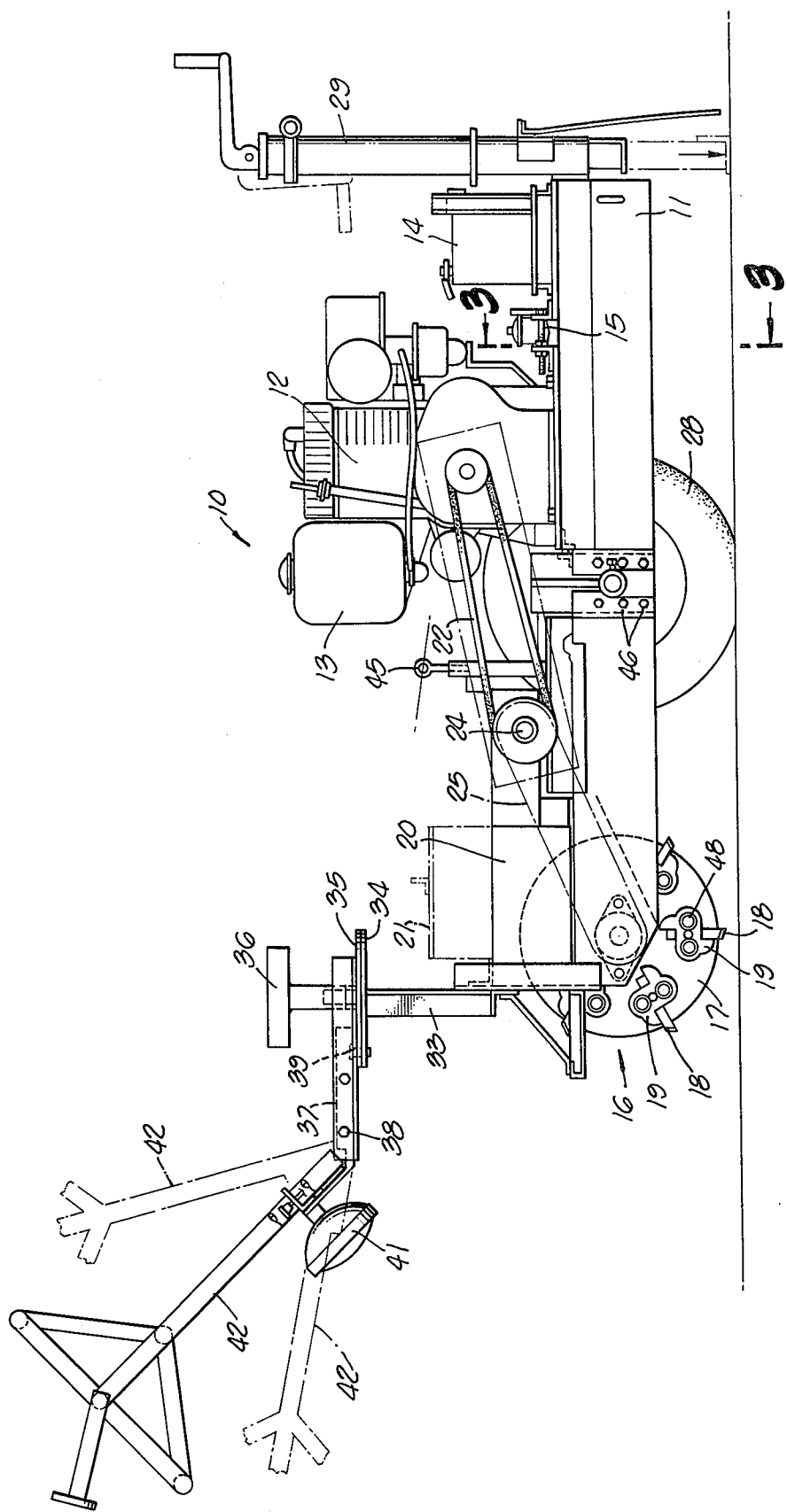

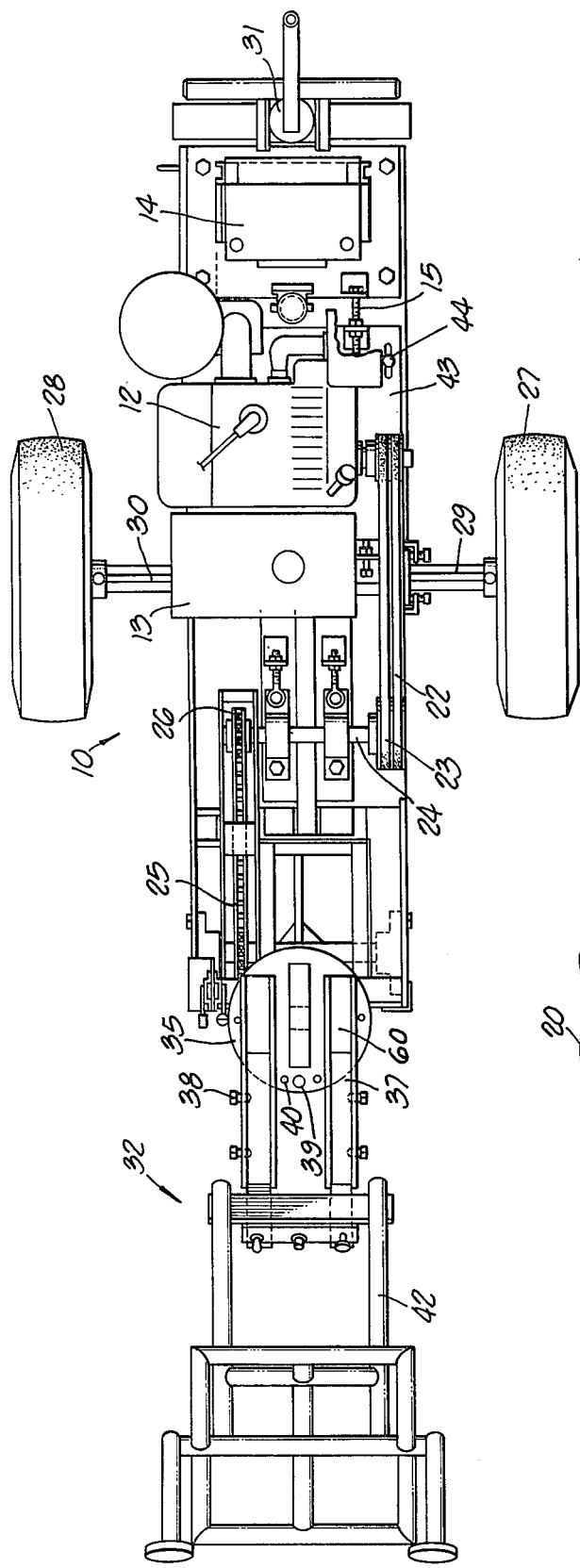
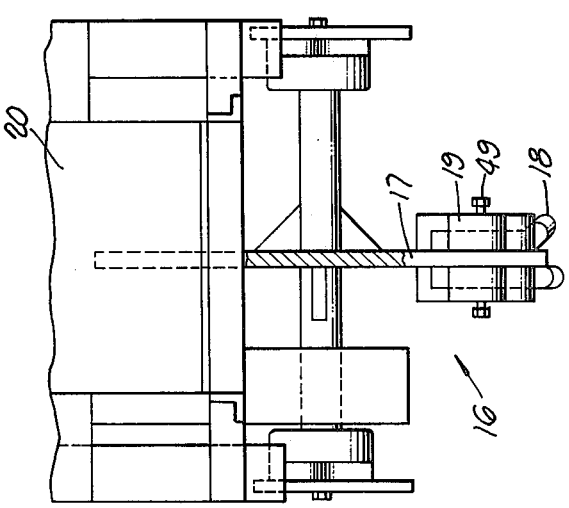

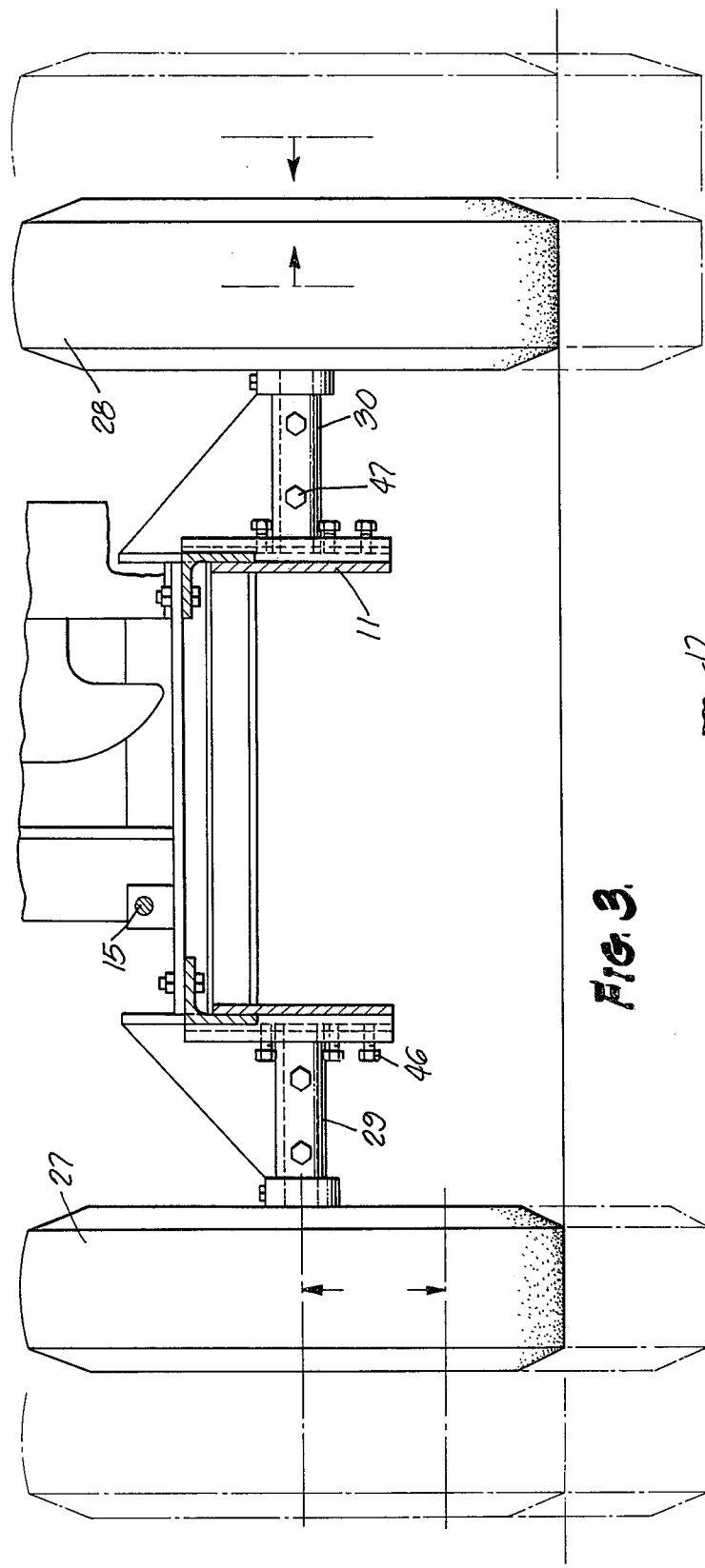
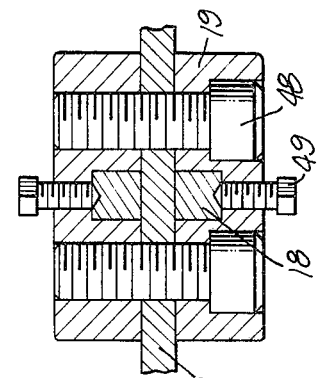
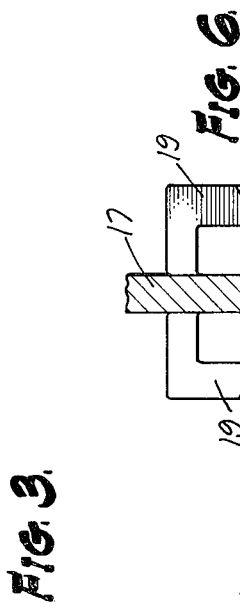
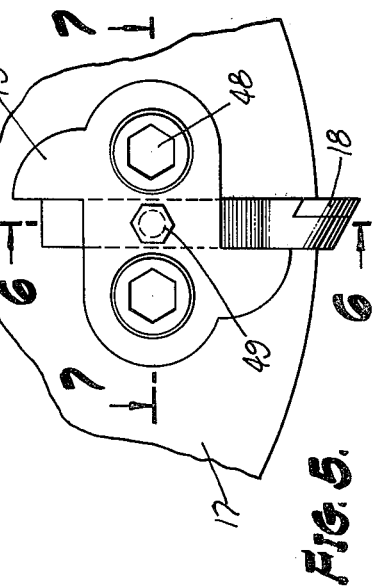

STUMP CUTTING AND PRECISION DIGGING APPARATUS

BACKGROUND OF THE INVENTION

This invention relates to a stump cutting and earth digging device and has particular reference to an apparatus which is manually controlled and power operated, yet possesses a portable light weight construction.

The utility of stump cutters have long been recognized in land clearing tasks by enabling the operator to cut the tree stump or other obstruction, to a substantial level below the surface of the ground. However prior art devices have generally been very expensive, bulky and awkward to operate. Further, these devices have generally been limited to a single function of stump cutting.

Realizing the shortcomings of known stump cutters, the instant inventors have developed a multifunction apparatus which operates as an extremely effective stump cutter and may readily be utilized for precision trench digging chores which finds application in the laying of pipe and electrical conduits, lawnsprinkler systems and the like. Moreover, the present invention provides a compact, portable device which possesses accurate control, efficient operation and has the virtue of low-cost manufacture.

SUMMARY OF THE INVENTION

The stump cutting/earth digging apparatus of the present invention includes a balanced, channel frame chassis medially supported by a pair of wheels which are independently mounted on vertically adjustable and horizontally telescopic axles. A combination belt and gear system provides drive means for a forward centrally disposed cutting wheel having a plurality of radially extending cutting teeth secured in an optimal configuration circumferentially on the cutting wheel. Further the instant apparatus includes a unique rotationally adjustable and telescopic handle means for accurate and easy control of the device.

Moreover, the present stump cutting and earth digging device provides an apparatus which is readily adaptable to varying conditions of the terrain encountered during operation, together with the features of safety and light weight construction.

Other advantages and objects of the present invention will become apparent from the accompanying more detailed description and drawings.

BRIEF DESCRIPTION OF THE DRAWINGS

FIG. 1 is a side elevational view of a stump cutting earth digging apparatus in accordance with the present invention;

FIG. 2 is a top planar view, further illustrating the stump cutting earth digging device in accordance with the present invention;

FIG. 3 is an enlarged front view showing the channel frame chassis and respective telescopic and adjustable axle mounting of the pneumatic tires taken along line 3—3 of FIG. 1;

FIG. 4 is yet another enlarged fragmentary front view showing the cutting wheel and cutting teeth mounting assembly of the aforementioned apparatus in accordance with the present invention;

FIG. 5 is a detailed fragmentary side view of a cutting tooth secured on a portion of the cutting wheel by suitable mounting means;

FIG. 6 is an enlarged front view of the aforementioned cutting wheel and respective cutting tooth taken along line 6—6 of FIG. 5;

FIG. 7 is a cross-sectional view taken along line 7—7 of FIG. 5, illustrating the mounting of the respective cutting tooth on the aforementioned cutting wheel.

DETAILED DESCRIPTION OF THE INVENTION

Figure 8:
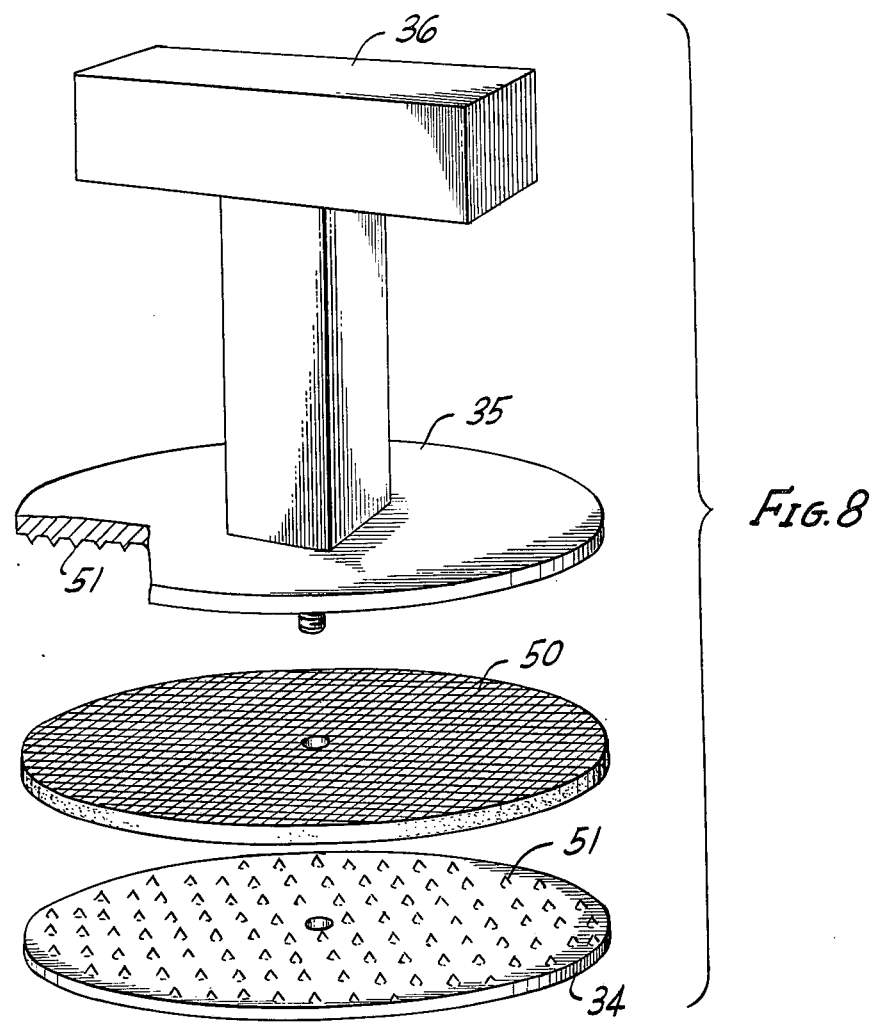
FIG. 8 is an enlarged exploded perspective view illustrating one embodied means for providing a rotatably adjustable handle on the stump cutting/earth digging apparatus in accordance with the present invention.

Referring now to the drawings, and with particular reference to FIG. 1, there is shown a stump cutting and earth digging device, generally denoted 10 in accordance with the present invention. The apparatus possesses a channel frame member 11 on which a conventional 10 h.p. engine 12 and fuel tank 13 are mounted. Further, a conventional ignition system, including a battery 14, solenoid 15, and starter are mounted on the frame member 11, and appropriately positioned to provide an overall balanced relationship with respect to the aforementioned engine 12 and tank components 13.

Additionally, as seen in FIG. 1, the device 10, includes a forward centrally disposed cutting means 16, which may be described as a rotationally driven cutting wheel 17, having a plurality of radially extending cutting teeth 18, circumferentially mounted by a plurality of compressively adjustable pocket or clamp elements 19 on the cutting wheel 17. The teeth are preferably composed of steel carbide or other durable material and are secured in an optimal configuration, which will subsequently be defined in greater detail in the following description.

Further, the cutting wheel 17 is provided with a partial encasement 20 including a removable top cover 21 for inspection and cleaning of the cutting wheel 17, the cutting teeth 18 and pocket elements 19, when necessary.

The channel-like frame member 11 shown in FIGS. 1 and 3 is a preferred shape of the chassis as it provides an efficient means for controlling the expelled sawdust and dirt during operation of the instant apparatus. Accordingly, the sawdust and dirt are propelled by cutting means 16 to the rear of the machine where it is stopped by a rubberized canvas flap (not shown), attached underneath the aforementioned frame member 11.

Referring now to FIG. 2, a combination belt and chain drive system is depicted, for driving the cutting means 16.

More particularly, the drive system includes a plurality of drive belts 22 and 23, which translates the rotary motion of the drive shaft of engine 12 to a forwardly mounted axle 24. A chain element 25, connected to the axle 24 through a known gear mechanism 26, in turn, transmits the rotary motion to the cutting wheel 17 of the aforementioned cutting means 16.

The combination belt and chain drive system is desirable in accordance with the present invention as it eliminates the necessity of a separate clutch system. Specifically, drive belts 22 and 23 will act as a slip clutch to reduce the drive exerted on the axle 24 when the cutting means 16 encounters an obstruction in the cutting path.

Again, referring to FIG. 2, the components of the drive system are mounted on the chassis of the instant apparatus to substantially eliminate horizontal protrusion of the belt 22 and 23, drive axle 24 or chain element 25 beyond the width of the frame member 11.

A pair of conventional pneumatic tires 27 and 28 are adjustably mounted on individual axles 29 and 30 to medially support frame member 11. In this regard, the pneumatic tires 27 and 28 act as a fulcrum for the balancing of the instant device and thereby provides for easier and surer handling of the apparatus.

As seen with more detail in FIG. 3, the mounting of tires 27 and 28 on separate telescopic axles 29 and 30, respectively, provides for a wide range of adjustment in the vertical and horizontal mounting dimensions. More particularly, telescopic axles 29 and 30 each consist of a hollow tube-like casing in which the axle shaft is concentrically inserted. Bolt members 47 provide compressive force locking the inner axle shaft in a selected position. Accordingly, the mounting width of the pneumatic tires may be adjusted to a desired span and allow small and large diameter tree stumps to be removed with sufficient support for the instant device.

Further, the mounting height of the pneumatic tires 27 and 28 may be selected by similarly adjusting bolt members 46 to provide compressive force against the inserted axle flange which is slidably mounted in a casing on the frame member 11. Hence, in accordance with the foregoing features the instant apparatus can be readily adapted to varying conditions of the terrain encountered during operation.

To facilitate the adjustment of the aforementioned mounting dimensions, the present apparatus includes lifting means 31 to elevate and support the frame member 11. Hence, when it is necessary to change the vertical height or horizontal span of the tire axles 29 or 30, the operator may lower the base support of the lifting means 31 by rotating a handle of the means 31 in a manner similar to that of a conventional jack mechanism.

Additionally, FIGS. 1 and 2 illustrate an embodied swivel and rotatably adjustable handle means generally denoted 32. The handle means 32 includes an upstanding leg 33 which supports a pair of rotatably adjustable plate elements 34 and 35. More particularly, plate 34 is provided with a series of drilled apertures 40, preferably spaced at 15° intervals about the marginal portion of the plate circumference. Accordingly, plate element 35 is provided with one or more cooperating pins 39 which engage the aforementioned apertures 40 of plate 34. In this regard, when an operator of the instant device desires to change the radial position of the handle shaft 42 (suitably secured to the plate 35) the handle shaft 42 with plate 35 are lifted and rotated accordingly whereby the top plate pin elements 39 cooperate with the aperture 40 of the underlying plate. To firmly lock the aforementioned plate elements 34 and 35 into engagement, a threaded top member 36 is provided which applies compressive force when suitably secured with a bolt of upstanding leg 33.

Further, the embodied means 32 is provided with a telescopic adjustment feature including channel portions 60 which receives sliding flanges 37 of the handle shaft 42. A plurality of bolts 38 suitably arranged in the channel portions 36 act to secure flanges 37 in the desired extended position.

Additionally, an electrical lamp 41 is optionally included on the handle shaft 42 for illuminating the immediate surface which is to be cut.

The handle means 32 may be provided with swivel adjustment. Accordingly, a conventional locking gear or hinge is included near the juncture of the shaft 42 and sliding flange elements 37.

As depicted in FIG. 2, the engine of the instant apparatus is supported on the frame member 11 by utilizing a slidable mounting plate 43 and cooperating bolts 44. In this manner the tension on the aforementioned drive belts 22 and 23 can be conveniently adjusted by suitably positioning the mounting plate 43 and tightening the bolts 44. Further, the instant apparatus may include a plurality of upwardly extending eyelets 45 for securing a choke cable and electrical wires in place.

Referring now to FIGS. 4 through 7, there is illustrated an optimal mounting configuration for the teeth 18 of cutting means 16, in accordance with the present invention. Moreover, the instant inventors have discovered that the amount of protrusion beyond the cutting wheel 17 and angle of orientation of the aforementioned cutting teeth 18 are critical factors in the resulting efficiency of the apparatus.

As shown in FIGS. 4 and 6, it was determined that the most efficient cut was obtained from the cutting means 16 when one of the cutting teeth 18 was oriented at a 45° angle, while the other tooth is maintained parallel to the cutting wheel 17. Further, it was determined that a ¼ inch projection of the aforementioned angled tooth and 3/16 inch projection of the straight tooth beyond the circumference of the cutting wheel was the optimal mounting.

Additionally, six sets of cutting teeth mounted in staggered fashion on the wheel 17 was found to be the preferred maximum. That is to say, the afore-described angles of orientation of the cutting teeth alternate from clamp mounting to clamp mounting around the circumference of the cutting wheel 17.

Moreover, it was determined that the aforementioned tooth mounting projections could be varied within limits of ¼ inch and still produce acceptable results.

Again referring to FIGS. 4 through 7, the aforementioned cutting means 16 includes pocket or clamp elements 19, which are suitably secured to cutting wheel 17, by a plurality of bolts 48.

In a similar manner, the aforedescribed mouting configuration of the cutting teeth 18 is maintained by bolts 49.

In yet another embodiment for providing a rotatably adjustable handle means 32, the supporting plates 34 and 35 may include a frictional lining 50 such as a fibrous padding embedded with an elastomeric coating interposed between the plates 34 and 35 as shown in FIG. 8. Hence, as an alternative to the cooperating pin and aperture securement, both plates 34 and 35 are provided with bead-like protrusions 51 on their engaging surfaces. These aforementioned bead-like protrusions may be formed by welding small bits of solder to the exposed surfaces of the plates 34 and 35.

Although the foregoing description of the instant apparatus describes a conventional 10 h.p. engine for driving the cutting means 16, it should be understood that the present invention is not limited to the use of this magnitude of power. Moreover, any power means capable of exerting sufficient drive on the cutting wheel 17 can be utilized, with a 16 h.p. motor having the preferred maximum output.

In a preferred mode of operation, the user stands forward of the cutting means 16 and grasps the handle grips of the handle shaft 42. Accordingly, for cutting stumps or other removable obstructions, the operator starts the cutting wheel 17 to the rear of the stump and moves the apparatus from side to side with a lateral motion, the apparatus being pivoted about the wheels 27 and 28. The cutting wheel 17 rotates vertically and proceeds to chip away the stump. In turn, the operator pulls the apparatus forward toward himself and continues the side to side motion of the cutting wheel until the first level of the stump is chipped away. Subsequently, the operator moves the cutting wheel above and toward the rear of the stump whereby the aforedescribed cutting procedure is repeated until each desired level is chipped away.

Alternatively, for digging trenches and the like, the operator lowers the cutting wheel to the ground and applies slight downward pressure of the handle grips of the handle shaft 42. As the earth is ripped to the desired depth, the operator pulls the apparatus toward himself as he walks rewardly following a pre-determined course.

Thus, in accordance with the present invention, the balanced and lightweight construction of the device provides an extremely efficient means for removing tree stumps and for digging trenches, in a safe and convenient manner.

Various changes coming within the spirit and scope of my invention may suggest themselves to those skilled in the art; hence, I do not wish to be limited to the specific embodiments shown and described or uses mentioned, but intend the same to be merely exemplary. The scope of my invention being limited only by the appended claims.

We claim:

1. A stump cutting and digging apparatus comprising in combination:
 a main supporting frame of a vehicle member, the frame having an integral elongated channel which acts as a guide for controlling cut material;
 a cutting wheel mounted on the frame and longitudinally aligned with the channel for rotation about a horizontal axis transverse to said channel, said cutting wheel having a plurality of radially extending cutting teeth circumferentially mounted on the cutting wheel; and
 drive means for powering said cutting wheel to cut material and to convey a majority of the cut material through the channel of said frame of the vehicle member.

2. The apparatus as defined in claim 1 further including a pair of wheels which balance and medially support said frame.

3. The apparatus as defined in claim 2 wherein each wheel of said pair of wheels is mounted on a separate and individually adjustable axle.

4. The apparatus as defined in claim 3 wherein said individually adjustable axle includes means for telescoping the length of said axle.

5. The apparatus as defined in claim 1 and further including a rotatably adjustable handle mounted on said frame.

6. The apparatus as defined in claim 5 wherein said rotatably adjustable handle includes:
 a pair of support plates mounted on said frame, one of said plates having apertures in the surface thereof; and
 the other of said plates having a pin which engages said apertures to lock said handle in a selected position.

7. The apparatus as defined in claim 5 wherein said rotatably adjustable handle includes:
 a pair of support plates mounted on said frame, both of said plates having bead-like projections on the engaging surfaces thereof; and
 a fibrous padding interposed between the engaging surfaces of said plates;
 and means for applying a compressive force to said pair of support plates whereby said bead-like projections in contact with said fibrous padding effect an adjustable securement of the support plate surfaces.

8. The apparatus as defined in claim 1 wherein said drive means includes at least one drive belt and a chain element.

9. The apparatus as defined in claim 1 wherein said cutting teeth are mounted on said cutting wheel by compressively adjustable clamp elements.

10. The apparatus as defined in claim 1 wherein said cutting teeth are mounted in pairs on said cutting wheel, said cutting wheel having a planar side surface, and one cutting tooth of the pair of teeth is oriented at a 45° angle from the planar surface of said cutting wheel.

11. The apparatus as defined in claim 10 wherein the angled tooth is mounted to project ¼ inch beyond the periphery of said cutting wheel and the other cutting tooth is mounted to project 3/16 inch beyond the periphery of said cutting wheel.

12. A stump cutting and digging apparatus comprising in combination:
 an elongate chassis having a forward end, an intermediate portion, a rear end and spaced wheels supporting the intermediate portion of the chassis above ground level, said chassis defining a channel for guiding cut material away from the vicinity of the forward end of said chassis;
 a power driven cutting wheel mounted for rotation about a horizontal axis transverse to said channel on the forward end of the chassis, and longitudinally aligned with said channel said cutting wheel having a plurality of radially extending cutting teeth circumferentially mounted on the cutting wheel; and drive means for powering said cutting wheel.

13. The apparatus of claim 12 wherein the spaced wheels are each mounted on an individually adjustable axle.

14. The apparatus of claim 13 wherein said individually adjustable axle includes means for extending the length of said axle and further includes means for varying the height of the mounted wheel.

15. The apparatus of claim 12 and further including a rotatably adjustable handle mounted on the forward end of said chassis.

16. The apparatus of claim 12 wherein said drive means includes at least one drive belt and a chain element for translating rotation from a drive shaft of an engine mounted on said chassis.

17. The apparatus of claim 12 wherein said cutting teeth are mounted on said cutting wheel to project at least ¼ inch beyond the periphery of said cutting wheel.

18. The apparatus of claim 12 wherein said cutting teeth are mounted on said cutting wheel by compressively adjustable set screws which engage a portion of the cutting teeth.

* * * * *